United States Patent [19]

Chamblin

[11] 4,074,742
[45] Feb. 21, 1978

[54] INDICATOR FOR TIRE WEAR PATTERNS

[76] Inventor: Kenneth Donald Chamblin, 4219 Arcturus Ave., Lompoc, Calif. 93436

[21] Appl. No.: 727,297

[22] Filed: Sept. 27, 1976

[51] Int. Cl.² .............................................. B60C 11/00
[52] U.S. Cl. .................................. 152/330 A; 156/114
[58] Field of Search ................... 152/208, 209 R, 167, 152/170, 185, 187, 330 A; 156/114, 96

[56] References Cited

U.S. PATENT DOCUMENTS 3,007,506  11/1961  Bowler ................................ 152/208

FOREIGN PATENT DOCUMENTS 2,250,798  4/1974  Germany ........................ 152/330 A
448,223  6/1936  United Kingdom ............ 152/330 A Primary Examiner—Drayton E. Hoffman
Assistant Examiner—Donald W. Underwood
Attorney, Agent, or Firm—Harry W. Brelsford

[57] ABSTRACT

A multilayer adhesive strip is adhered to the tread of an automobile or other vehicle tire transversely of the tread and generally axially of the wheel. Each layer has a different color, and wear on one part of the strip faster than another will expose a different color or colors that will indicate the wear pattern. Thin easily worn material may indicate the pattern in a mile or two of driving whereas thicker or tougher strips give results over a longer period of use. For example, differential wear in the center indicates over-inflation, differential wear at both ends indicates under-inflation, and differential wear at one end of the strip indicates wheel misalignment.

6 Claims, 4 Drawing Figures

INDICATOR FOR TIRE WEAR PATTERNS

This invention relates to tire wear indicators and particulrly relates to a wear indicator that the motorist himself can apply to the exterior of an automobile tire.

There has long been a need for a simple inexpensive tire wear indicator. Wear indicators have been used for years, but these have been built into the tires during manufacture or the tire treads have been drilled and plugs inserted into these holes to indicate wear. Usually layers of different color material have been used to indicate the amount of wear. However, none of these prior art devices seems to be applicable to the exterior of a tire and instead seems to be embedded in the tread in one fashion or another.

In summary, my invention consists of adhering strips transversely of the tread. These strips are multilayered and preferably of three or more layers, all of a different color. If the tire is over-inflated the center part of the strips will wear out faster than the edges and expose the second layer, which being a different color will indicate over-inflation. If the over-inflation is gross, two or more strips will wear through, giving a quantitative indication of over-inflation. Similarly, under-inflation will be indicated by differential wear at the ends and wheel misalignment will be indicated by differential wear at one end. Thin layers are used to get quick results after a few miles of travel, and thick tough layers are used for more long-term testing.

Various objects, advantages, and features of the invention will be apparent in the following description and claims, considered together with the drawings forming an integral part of this specification and in which:

Figure 1:
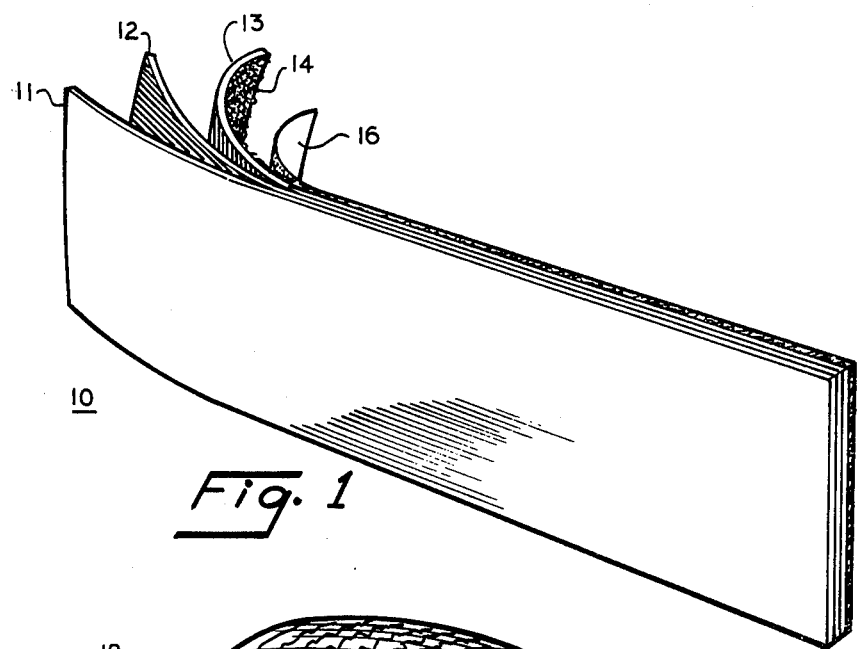
FIG. 1 is a three-dimensional view of an indicator strip provided in accordance with the invention on an exaggerated thickness scale and showing one end spread apart to indicate the colors of the different layers.

Referring to FIG. 1, there is illustrated a representative indicator strip 10 provided in accordance with the invention having multiple layers which can be any number, and three layers are illustrated, an outer white layer 11, an inner green layer 12, and still another inner layer 13, which may be red. The colors of the layers are indicated by the usual shading or absence thereof, and absence of shading on the outer layer 11 indicates that it is white. The diagonal lines on layer 12 indicate that it is green, and the vertical lines on layer 13 indicate that it is red. Applied to the outer surface of the red layer 13 is adhesive 14, which may be protected until actual use by a peel-off paper or fabric strip 16.

Figure 2:
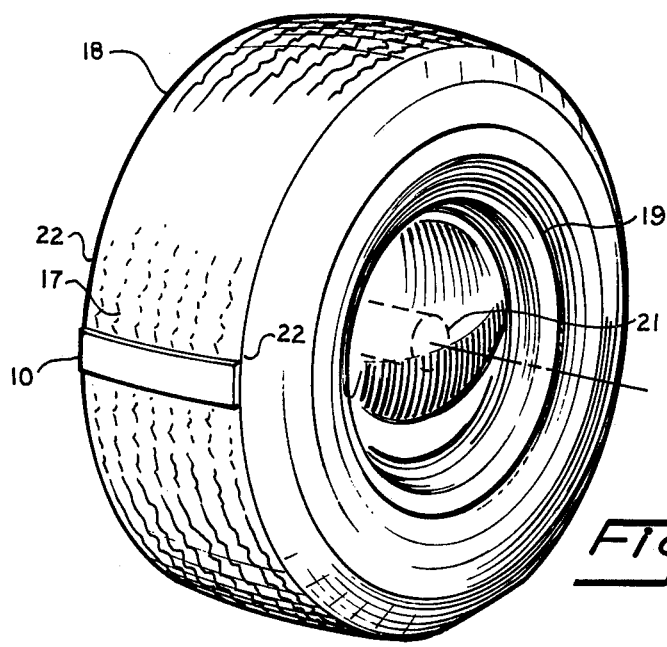
FIG. 2 is a three-dimensional view of an automobile wheel and tire with the strip of FIG. 1 applied transversely to the tread and in a generally axial position with respect to the wheel axis.

Referring to FIG. 2, a strip 10 constructed as illustrated in FIG. 1 is applied to the outer tread 17 of an automobile tire 18 having an inner wheel 19, which rotates about an axle 21, which defines an axis of rotation for the entire assembly of wheel and tire. In this connection, it will be noted that the strip 10 is generally parallel to the axis of the wheel 19 and is generally transverse to the tread 17. It is desirable to have the strip 10 extend clear across the road contact portions of the tread to the sidewalls 22 of the tread.

Figure 3:
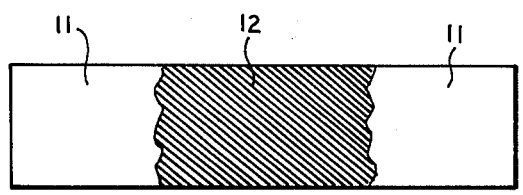
FIG. 3 is an elevation view of the strip of FIG. 1 when it has been applied to an automobile tire that is over-inflated so that the center is worn more than the edges to expose the second or third layer of the strip, which layer has a different color to indicate wear.

Referring to FIG. 3, there is illustrated a strip which has been applied to a tire as shown in FIG. 2, which tire has been over-inflated and then driven a sufficient distance to register wear on the strip 10. There it will be noted that the outer layer 11, which is white in color, is intact on the two ends, but that the center is worn to reveal the green color of the next layer 12. This pattern of wear, therefore, shows that the tire is over-inflated. If the tire were grossly over-inflated, there would be remnants of the white outer layer 11, portions of the next layer 12, and there would be revealed the bottom red layer 13 of FIG. 1. Conversely, if the tire were under-inflated the ends of the strip 10 would be worn faster than the center part, and at one stage of wear the outer ends of the strips 10 would reveal a green color, and the center would be white.

Figure 4:
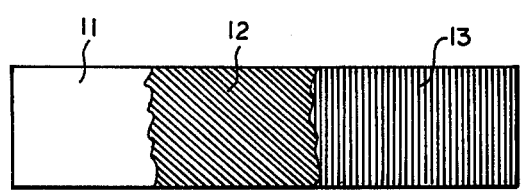
FIG. 4 is an elevation view of a strip in accordance with FIG. 1, which has been applied to an automobile tire where the wheels are out of alignment so that there is more wear on one end of the strip than the other, which misalignment is shown by the difference in colors of the different layers of the strip.

Referring now to FIG. 4, there is illustrated an indicator strip 10, which has been applied to a wheel that is misaligned, usually one of the front wheels of an automobile. In this case the outer white layer 11 appears at the lefthand end of the strip, the green intermediate layer 12 is shown in the center, and because of excessive wear both the outer white and the inner green layers have been worn away to reveal the bottommost red layer 13.

The strip 10 may be constructed of different materials having different rates of wear and also may be constructed of different thicknesses. In any event it is desirable to have the mass of the strip small enough so that it will not unbalance and thin enough so that it will not create a bump to the vehicle as the wheel rotates over the pavement. For most strip purposes the layers may be from two to four-thousandths of an inch in thickness, and an overall thickness of the three layers may be on the order of five to ten-thousandths of an inch thick. If, however, a long-term indication of wear is required, that is, where there is just a slight amount of over-inflation suspected or a slight amount of under-inflation, then the thicknesses of the strips 11, 12, and 13 may be increased, or alternatively may be made of much tougher material.

The use of unvulcanized rubber for the strips 11, 12, and 13 gives very quick indication of wear patterns of a tire, inasmuch as this material is soft and not resilient and wears readily. For a long duration test, strips made of vulcanized rubber are preferred. Various plastics may be used also, including the softer silicon compounds, the softer polyvinyl chloride compounds, and various other thermal softening plastics.

Adhesion of the strip to the tread surface is aided by the use of contact cement, that is, by scrubbing the surface of the tread to which the strip is to be applied with an abrasive material such as sandpaper, painting the surface with a contact cement such as latex in a liquid form, and stripping off the protective cover sheet 16 from the strip to expose the fresh adhesive 14, and then applying the strip to the tread when the contact cement has appropriately dried.

Various modifications and uses of my indicator strip will be apparent to those skilled in the art. It is obvious that very many materials may be used from which the strips may be formulated, and various means of adhering the strips to the surface of the tread may be used. Any desired number of layers may be used on the strips, and these may be in any desired color or arrangement of colors. I have illustrated my invention in accordance with my presently preferred embodiment thereof as required by the Rules, and I do not limit myself to the embodiment disclosed as it is merely illustrative of my invention, and I include within the scope of the following claims all variations and modifications that fall within the true spirit and scope of my invention.

I claim:

1. The combination of a vehicle tire and an adhesive strip applied to the exterior surface of the tread of the tire, said strip comprising multilayers of different colors, so that differential wear of the layers of the strip will readily reveal tread wear patterns of the tire prior to adverse tire tread wear by a difference in color, said adhesive strip having a thickness measured radially on the tire on the order of several thousandths of an inch, resulting in the strip having a bulk so small that the roundness of the tire is maintained and bumping avoided, and the strip mass being so small that wheel balance is substantially maintained.

2. The combination of claim 1 wherein adhesive is applied to one surface of the strip before assembly so that the strip can be adhered to the tire to form the combination.

3. The combination of claim 1 wherein the layers are thin and formed of readily worn material having wear characteristics of the type of unvulcanized rubber to give a rqpid indication of wear pattern.

4. The combination of claim 1 wherein the layers are tough and wear-resistant having wear characteritics similar to vulcanized rubber to display a wear pattern over a long period of tire use.

5. The combination of claim 1 wherein the colors of the layers contrast with the color of the tire tread.

6. For use on a vehicle tire to determine wear patterns, an adhesive strip having multilayers of different colors and having a thickness on the order of several thousandths of an inch and for adhering transversely to the tread of a tire, said strip readily revealing tread wear patterns of the tire prior to adverse tire tread wear upon differential wear of parts of the strip to reveal different colors whereby said strip results in a strip having a bulk so small that the roundness of the tire is maintained and bumping avoided, and the strip mass being so small that wheel balance is substantially maintained.

* * * * *